United States Patent Office 2,856,411
Patented Oct. 14, 1958

---

2,856,411

ESTERS OF N-ALKYLCARBAMIC ACIDS

Edward A. Prill, Yonkers, N. Y., assignor to Boyce Thompson Institute for Plant Research, Inc., a corporation of New York No Drawing. Application October 23, 1956
Serial No. 617,699

6 Claims. (Cl. 260—340.5)

This invention relates to a new class of esters of N-alkylcarbamic acids and, more particularly, to the preparation of the 3,4-methylenedioxyphenylalkyl N-alkylcarbamates. These compounds are structurally represented by the formula

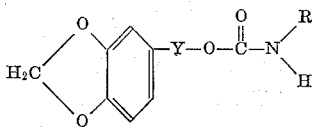

in which Y is an alkylene radical containing from 1 to 5 carbon atoms, and R is an alkyl radical containing up to 20 carbon atoms and selected from the group consisting of aliphatic hydrocarbon radicals, cycloalkyl radicals, alkoxyalkyl radicals, and aralkyl radicals.

The 3,4-methylenedioxyphenylalkyl N-alkylcarbamates possess a pronounced insecticidal activity, and are particularly suited for use as synergists and extenders for pyrethrins, allethrin (3-allyl-2-methyl-4-oxo-2-cyclopentyl chrysanthemummonocarboxylate), and similar structurally-related insecticides.

Easily prepared from readily available starting materials, the N-alkylcarbamates of this invention are almost completely devoid of objectionable malodors and irritations. In general, these compounds are either oily, viscous liquids or low-melting waxy solids, and contribute negligible coloration when used in insecticidal formulations.

Preparation of the 3,4-methylenedioxyphenylalkyl N-alkylcarbamates may be accomplished by reacting a 3,4-methylenedioxyphenylalkanol together with a slight molar excess of an alkyl isocyanate, preferably in an inert solvent. For example, 3,4-methylenedioxyphenylmethyl N-n-heptylcarbamate was prepared by refluxing a benzene solution of 15 grams of piperonyl alcohol together with 15 grams of n-heptyl isocyanate.

Isolation of the N-alkylcarbamate from the reaction mixture may best be accomplished by initially decomposing the unreacted isocyanate with an alkanolamine, such as diethanolamine, to a water-soluble ureide which may be removed by aqueous washing. After removal of any solvent and volatile impurities by steam distillation, the N-alkylcarbamate remains in the distillation unit, and may be used in an insecticidal formulation without further purification.

An unusually large number of 3,4-methylenedioxyphenylalkyl N-alkylcarbamates may be prepared via this general reaction of an alkanol and an alkyl isocyanate. Thus, the reaction of an alkyl isocyanate with such alkanols as piperonyl alcohol, piperonyl carbinol, β-piperonylethanol, and α-ethylpiperonyl alcohol can be used to form the 3,4-methylenedioxyphenylmethyl, 3,4-methylenedioxyphenylethyl, 3-(3,4-methylenedioxyphenyl)propyl, and 1-(3,4-methylenedioxyphenyl)-propyl N-alkylcarbamates, respectively.

In general, the selection of a suitable alkyl isocyanate is limited solely by availability. The alkyl isocyanate may be conveniently prepared by reacting a corresponding acylchloride with sodium azide. By way of illustration n-heptyl and isobutyl isocyanates were conveniently prepared in high yield from octanoyl and isovaleryl chlorides, respectively. Alternatively, the alkyl isocyanate may be obtained from the reaction of an alkylamine with phosgene. Alkyl isocyanates which have been successfully used with the alkanols to prepare the N-alkylcarbamates of this invention include n-butyl isocyanate, n-amyl isocyanate, isoamyl isocyanate, 2-ethylbutyl isocyanate, 2-ethylhexyl isocyanate, decyl isocyanate, lauryl isocyanate and stearyl isocyanate. In addition, the cycloalkyl isocyanates such as cyclohexyl isocyanate and methylcyclohexyl isocyanate, as well as the aralkyl isocyanates, including benzyl and phenylethyl isocyanates, may be used successfully.

The compounds listed in Table I are examples of the N-alkylcarbamates of the invention which, when used in combination with such insecticides as pyrethrins or allethrin, exhibit as pronounced synergistic insecticidal activity.

TABLE I 3,4-methylenedioxyphenylalkyl N-alkylcarbamates

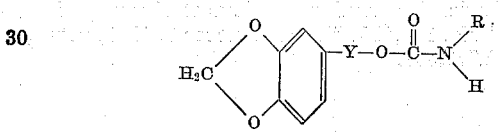

| Compound | Y | R |
|---|---|---|
| 3,4 - Methylenedioxyphenylmethyl N-methylcarbamate | —CH$_2$— | Methyl. |
| 3,4 - Methylenedioxyphenylmethyl N-isobutylcarbamate | —CH$_2$— | iso-Butyl. |
| 3,4-Methylenedioxyphenylmethyl N-n-heptylcarbamate | —CH$_2$ | n-Heptyl. |
| 3,4-Methylenedioxyphenylethyl N-stearylcarbamate | —C$_2$H$_4$— | Stearyl. |
| 3,4-Methylenedioxyphenylethyl N-cyclohexylcarbamate | —C$_2$H$_4$— | cyclo-Hexyl. |
| 3 - (3,4 - Methylenedioxyphenyl)propyl N-benzylcarbamate | —(CH$_2$)$_3$— | Benzyl. |
| 3 - (3,4 - Methylenedioxyphenyl)propyl N-methoxyethylcarbamate | —(CH$_2$)$_3$— | Methoxyethyl. |
| 3 - (3,4 - Methylenedioxyphenyl)propyl N-laurylcarbamate | —(CH$_2$)$_3$— | Lauryl. |
| 3 - (3,4 - Methylenedioxyphenyl)propyl N-(p-hexylbenzyl)carbamate | —(CH$_2$)$_3$— | p - Hexylbenzyl. |
| 3 - (3,4 - Methylenedioxyphenyl)propyl N-cyclohexylcarbamate | —(CH$_2$)$_3$— | cyclo-Hexyl. |
| 5-(3,4-Methylenedioxyphenyl)amyl N-isobutylcarbamate | —(CH$_2$)$_5$— | iso-Butyl. |
| 5-(3,4-Methylenedioxyphenyl)amyl N-n-heptylcarbamate | —(CH$_2$)$_5$— | n-Heptyl. |
| 5-(3,4-Methylenedioxyphenyl)amyl N-stearylcarbamate | —(CH$_2$)$_5$— | Stearyl. |
| 5-(3,4-Methylenedioxyphenyl)amyl N-cyclohexylcarbamate | —(CH$_2$)$_5$— | cyclo-Hexyl. |
| 5-(3,4-Methylenedioxyphenyl)amyl N-benzylcarbamate | —(CH$_2$)$_5$— | Benzyl. |
| 5-(3,4-Methylenedioxyphenyl amyl N-ethoxyethylcarbamate | —(CH$_2$)$_5$— | Ethoxyethyl. |

To illustrate the synergistic effect of these N-alkylcarbamates on the insecticidal capacity of pyrethrins, Table II summarizes the results achieved when an insecticidal formulation containing 0.4 gram of a representative N-alkylcarbamate and 0.05 gram of pyrethrins in 100 ml. of a petroleum distillate was tested by the Peet-Grady method. By way of comparison, the Official Test Insecticide (OTI), which contained 0.1 gram of pyrethrins in 100 ml. of a petroleum distillate, was also tested on each culture of flies. In each example no more than 5 percent of acetone was used as a co-solvent.

TABLE II

*Results of Peet-Grady tests on compounds plus added pyrethrins*

| Compound | Test Solution [1] Results | | OTI | |
|---|---|---|---|---|
| | 24 hr. Kill, Percent | 10 min. Knock-down, Percent | 24 hr. Kill, Percent | 10 min. Knock down, Percent |
| 3,4 - Methylenedioxyphenylmethyl N-n-heptylcarbamate | 87 | 98 | 42 | 98 |
| 3,4 - Methylenedioxyphenylmethyl N-isobutylcarbamate | 42 | 86 | 42 | 93 |
| 3-(3,4-Methylenedioxyphenyl)propyl N-isobutylcarbamate | 71 | 90 | 42 | 93 |
| 3-(3,4-Methylenedioxyphenyl)propyl N-n-heptylcarbamate | 67 | 89 | 42 | 93 |
| 5 - (3,4-Methylenedioxyphenyl)amyl N-n-heptylcarbamate | 70 | 85 | 41 | 93 |

[1] The test solution contained 0.4 gram of the N-alkylcarbamate and 0.05 gram of pyrethrins per 100 ml. formulation.

Although the N-alkylcarbamates of this invention have shown unusual effectiveness against houseflies, these compounds are also potent insecticides for other insect pests.

Insecticidal formulations containing the N-alkylcarbamates may be prepared using a petroleum distillate as a solvent, or emulsifying the compounds in a nonsolvating medium. Alternatively, aerosol formulations can be readily manufactured by dissolving a mixture of pyrethrins and the N-alkylcarbamate in a liquefiable gas, such as Freon.

This application is a continuation in part of my application, Serial No. 384,523, filed on October 6, 1953, now Patent No. 2,773,062.

I claim:

1. A 3,4-methylenedioxyphenylalkyl N-alkylcarbamate having the structure

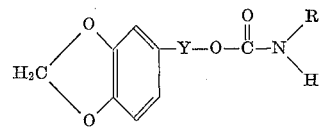

in which Y is an alkylene radical containing from 1 to 5 carbon atoms, and R is selected from the group consisting of alkyl radicals containing up to 20 carbon atoms, unsubstituted cycloalkyl radicals containing up to 20 carbon atoms, unsubstituted alkoxyalkyl radicals containing up to 20 carbon atoms, and unsubstituted aralkyl radicals containing up to 20 carbon atoms.

2. 3,4 - methylenedioxyphenylmethyl N - n - heptylcarbamate.

3. 3,4 - methylenedioxyphenylmethyl N - isobutylcarbamate.

4. 3 - (3,4 - methylenedioxyphenyl)propyl N - isobutylcarbamate.

5. 3 - (3,4 - methylenedioxyphenyl)propyl N - n-heptylcarbamate.

6. 5-(3,4-methylenedioxyphenyl)amyl N-n-heptylcarbamate.

References Cited in the file of this patent

UNITED STATES PATENTS 2,773,062     Prill _____ Dec. 4, 1956

OTHER REFERENCES

Prill: "Contrib. Boyce Thompson Institute," vol. 14, pages 221–227 (1946).

Migrdichian: "Organic Cyanogen Compounds," A. C. S. Monograph No. 105, pages 382–384 (1947).